Patented Jan. 17, 1928.

1,656,505

UNITED STATES PATENT OFFICE.

JAMES W. SCHWAB, OF GULF, TEXAS, ASSIGNOR TO TEXAS GULF SULPHUR COMPANY, OF BAY CITY, TEXAS, A CORPORATION OF TEXAS.

METHOD OF TREATING SULPHUR.

No Drawing. Original application filed January 30, 1924, Serial No. 689,564. Divided and this application filed December 10, 1926. Serial No. 154,037.

This invention relates to the treatment of sulphur, and more particularly to the treatment of sulphur containing impurities, such as small amounts of organic impurities, the presence of which impart to the sulphur an abnormal color or other objectionable property. The invention has for its object the provision of an improved method of treating such sulphur to improve its color and/or to ameliorate its other objectionable properties.

This application is a division of my copending application Serial No. 689,564 for the method of treating sulphur.

Sulphur is commonly produced or mined by underground fusion in accordance with the well-known Frasch process. In this process a fusing fluid, such as superheated water under pressure, is conveyed to the underground sulphur deposit where its heat is utilized in fusing the sulphur and the fused or melted sulphur is collected in the so-called sulphur wells and raised to the surface of the ground in a molten condition by suitable agencies, such, for example, as an air lift pump. The molten sulphur is then permitted to solidify and forms what is known in the industry as crude sulphur.

Crude sulphur as mined by the Frasch process is more nearly a pure substance than many carefully purified chemically pure chemicals. It often assays 99.95% sulphur and averages well over 99.5% sulphur. But crude sulphur always contains, in addition to minute amounts of inorganic matter, traces of impurities which affect its burning qualities and sometimes its color. These latter impurities are largely organic matter and are present in the sulphur on account of its contact with petroleum or bituminous substances which occur in the sulphur-bearing formations. The organic impurities are usually referred to as "oil."

Ordinary crude sulphur generally assays from 0.01% to 0.05% oil, but frequently contains larger amounts of oil. There does not seem to be any direct relationship between the amount of oil present in the sulphur and its color. Sulphur containing 0.02% oil may be dark brown in color, while other sulphur containing as much as 0.07% to 0.08% oil may be a bright yellow color.

Oil and sulphur react very rapidly at the temperatures prevailing at the burning point of sulphur itself and form black, asphaltic compounds which discolor the sulphur making it nearly black, and when burned an asphaltic film forms on the surface of the sulphur which ultimately extinguishes the flame. I have found that oil and sulphur react very slowly at the temperatures ordinarily prevailing in mining operations. If, however, crude sulphur is held for some time at the temperatures prevailing in mining operations, it loses its normal bright yellow color and becomes darker yellow or brownish in color. So, in actual mining, if sulphur as it is melted in the deposit does not happen to drain readily to a producing well, it may remain in the liquid state long enough for some of the oil to react with it and cause it to lose its characteristic bright yellow color and become dark. And, should the temperature of the molten sulphur become abnormally high so that the sulphur becomes viscous, then the color of the sulphur becomes dark more rapidly. The particular shade (that is color) of the solid sulphur probably depends upon how long it had remained in the liquid state before it finally reached a producing well and was removed from the deposit and solidified, and perhaps also, to some extent, upon the temperature attained by the sulphur while molten.

While the color of the crude sulphur can be fairly well controlled by careful placing of producing wells with reference to the portion of the sulphur deposit being mined, still there are often wells that produce dark or abnormally colored sulphur. In ordinary mining practice, it seems impossible not to produce some sulphur which in chemical composition and properties is practically identical with bright yellow sulphur, but which is dark or abnormal in color. The color of this dark sulphur leads those accustomed to bright sulphur to assume that it is inferior in quality, and is, therefore, a drawback to the sale of a product which is equal in quality to bright yellow sulphur.

The present invention contemplates the provision of a method of treating dark or abnormally colored sulphur to improve its color and more particularly to restore dark sulphur to its normal and characteristic bright yellow color. The invention also contemplates the provision of an improved method of removing oil and similar impurities from sulphur. In its broad aspect, the invention involves treating the sulphur in a molten condition with a natural silicious adsorbent material, such as typified by the natural products diatomaceous earth and tripoli, and subsequently separating the sulphur from the adsorbent material and such adsorbed or occluded impurities as have become associated therewith. Thus, the invention involves bringing dark colored sulphur, in a molten or liquid condition, into intimate contact with finely divided natural silicious adsorbents capable of adsorbing or occluding the dark colored impurities and in some cases a part or all of the oil. After a varying period of contact, depending upon the substance used, of from a few minutes to several hours, the sulphur is separated from the adsorbtive material and its adsorbed or occluded impurities by any appropriate means. The product is sulphur of a bright yellow color which may or may not contain noticeably less oil than before treatment.

Various substances are availble for the practice of the invention and I shall herein refer to these substances generically as natural silicious adsorbent materials. However, I wish it to be understood that I do not thereby intend to imply that the beneficial action of these materials is due solely to adsorption. On the contrary, it is my present belief that occlusion or absorption may and probably does take place, although to what extent the benefic al action of these materials is due, if at all, to these or other phenomena I am not now prepared to say.

The molten or liquid sulphur may be brought into the desired intimate contact with the natural silicious adsorbent material in any convenient manner, such, for example, as by agitation with the adsorbent material. Among the natural silicious adsorbent materials that I have found particularly effective for the purposes of the invention are diatomaceous earth and tripoli. Diatomaceous earth is known by a great many names some of which designate different grades or types of materials. Some of the names by which diatomaceous earth is known are infusorial earth, kieselguhr, fossil flour, fossil meal, tripolite, diatomite, polirschiefer, desmid earth, molera, white peat, tellurine, randanite, ceyssatite, bergmehl, radiolarian earth, as well as by the trade names "Sil-o-cel" and "Filter Cel". Diatomaceous earth is probably a hydrous or opalescent form of silica. It usually contains some clay and certain types contain lime. Pure diatomaceous earth is composed of the silicious remains of exceedingly minute aquatic organisms, known as diatoms, radiolaria, etc. These organisms are always present and are an absolute means of identification of diatomaceous earth. Tripoli is a form of silica derived either from the decomposition or alteration of chert or as a residual product from the decomposition of a highly silicious limestone. Tripoli contains no diatoms but is composed largely of extremely finely divided silica.

I have found that diatomaceous earth and tripoli possess to a marked extent the properties desirable for the practice of the present invention, and under proper conditions these substances eliminate dark colored impurities in the sulphur as well as some of the oil therein. Pumice, and other substances of similar properties, are also more or less effective in removing the dark colored impurities from the sulphur in accordance with my present invention, but these substances have generally been found less effective than diatomaceous earth.

The amount of the natural silicious adsorbent material required in the practice of my invention varies with different materials and with the amount of dark colored impurities and oil to be eliminated from the sulphur. In the case of diatomaceous earth less than 5% by weight on the amount of sulphur treated is usually sufficient to restore the color of the sulphur nearly to the characteristic bright yellow and to remove some of the oil. In case it is desired to remove substantially all of the oil from the sulphur, additions of other adsorbent reagents which preferentially adsorb the oil may be made.

The temperature at which the sulphur and the natural silicious adsorbent material are brought into contact may vary within wide limits. From an operating standpoint, it is preferable to bring about this contact at temperatures ordinarily now used in handling liquid sulphur, that is, from 240° to 320° F. It is to be understood, however, that higher temperatures, or even lower temperatures, may, if desired, be employed in the practice of the present invention.

The time of contact required for improving the color of sulphur and for the removal of the impurities therefrom varies with the particular material used, with the percentage of the material used, and with its degree of comminution. With finely divided diatomaceous earth only a few minutes are required to get effective results. With less finely divided diatomaceous earth much longer periods of contact may be required. The time of contact required will also vary with the character of the sulphur treated and with the degree to which it is desired to carry decolorization and oil removal.

The manner in which the necessary contact between the liquid sulphur and the substance used for removing the impurities is brought about may vary according to conditions. In most cases I prefer to agitate the molten sulphur with the adsorbent material and afterwards remove the latter by any suitable means such as by settling and decanting, filtering, centrifuging, or the like.

The invention will be further understood by the following examples:—

Example No. 1.

|  | Per cent adsorbent | Filtered product | |
|---|---|---|---|
|  |  | Per cent oil | Color No. |
| Diatomaceous earth | 2 | 0.028 | 2+ |
| Tripoli | 4 | 0.026 | 2 |
| Crude sulphur | 0 | 0.044 | 7 |

The numerals used in the above table may be better understood by reference to the following description. The adsorbent was mixed with the melted sulphur at a temperature of about 260° F. and thoroughly agitated until the mixture of sulphur and adsorbent was quite intimate. The materials were allowed to stand in contact with each other for a few moments and then the adsorbent and sulphur were separated by filtration. It will be noticed that the oil content has been lowered to almost one half of the original and the color number has been reduced from 7 to 2.

There being no standard method of determining the gradations of discoloration of sulphur an arbitrary system has been devised and standardized. Long familiarity with these samples enables one to accurately gauge the color of a sample without even a check comparison with the standards maintained for that purpose.

The standards as far as it is possible to describe the colors are as follows:

| Color No. | Ordinary description |
|---|---|
| 1 | Very, very bright. |
| 2 | Very bright. |
| 3 | Bright. |
| 4 | Fairly dark. |
| 5 | Dark. |
| 6 | Very dark. |

From color No. 6 on to No. 10 the shades are proportionately darker.

Example No. 2.

50 grams of dark sulphur (4+) assaying 0.032% oil were agitated with about 8% by weight of infusorial earth (celite grade BH) for about 45 minutes at a temperature of about 250°-260° F. The resulting mixture was filtered through filter paper. The sulphur filtrate was very bright in color (2) and assayed 0.028% oil.

I claim:

1. The method of improving the color of abnormally colored sulphur which comprises treating the sulphur in a molten condition with finely divided diatomaceous earth, and separating the molten sulphur from the diatomaceous earth and thereby obtaining sulphur of a color substantially approximating the characteristic normal yellow color.

2. The method of treating sulphur containing impurities, such as small amounts of organic matter, which impart to the sulphur an abnormal color, which comprises bringing the sulphur in a molten condition into intimate contact with diatomaceous earth, and separating the molten sulphur from the diatomaceous earth and thereby obtaining sulphur of a color substantially approximating the characteristic normal yellow color.

3. The method of treating sulphur containing impurities, such as small amounts of organic matter, which impart to the sulphur an abnormal color, which comprises agitating the sulphur while molten in the presence of finely divided diatomaceous earth, and separating the molten sulphur from the diatomaceous earth and thereby obtaining sulphur of a color substantially approximating the characteristic normal yellow color.

4. The method of treating sulphur containing impurities, such as small amounts of organic matter, which impart to the sulphur an abnormal color, which comprises bringing diatomaceous earth into intimate contact with the sulphur at a temperature from about 240° F. to about 320° F., and separating the molten sulphur from the diatomaceous earth and thereby obtaining sulphur of a color substantially approximating the characteristic normal yellow color.

5. The method of improving sulphur containing contaminating impurities, which comprises bringing the sulphur in a molten condition into contact with diatomaceous earth, and subsequently separating the molten sulphur from the diatomaceous earth and the impurities associated therewith.

6. The method of treating sulphur containing contaminating impurities which comprises passing the sulphur in a molten condition through a medium containing diatomaceous earth and thereby removing a large part of the contaminating impurities from the sulphur.

7. The method of improving the color of abnormally colored sulphur which comprises treating the sulphur in a molten condition with a natural silicious adsorbent material, and separating the molten sulphur from the adsorbent material and thereby obtaining sulphur of a color substantially approximating the characteristic normal yellow color.

8. The method of treating sulphur containing impurities such as small amounts of organic matter, which impart to the sulphur an abnormal color, which comprises bringing a natural silicious adsorbent material into intimate contact with the sulphur at a temperature from about 240° F. to about 320° F., and separating the molten sulphur from the adsorbent material and thereby obtaining sulphur of a color substantially approximating the characteristic normal yellow color.

In testimony whereof I affix my signature.

JAMES W. SCHWAB.